US006006625A

United States Patent [19]

Nagashima

[11] Patent Number: 6,006,625

[45] Date of Patent: Dec. 28, 1999

[54] HAND LEVER DEVICE

[75] Inventor: Akira Nagashima, Kanagawa, Japan

[73] Assignee: Kioritz Corporation, Tokyo, Japan

[21] Appl. No.: 08/994,656

[22] Filed: Dec. 19, 1997

[30] Foreign Application Priority Data

Dec. 27, 1996 [JP] Japan .................................... 8-350627

[51] Int. Cl.[6] ............................. F16C 1/12; B62K 21/26; G05G 11/00

[52] U.S. Cl. ........................... 74/501.6; 74/551.9; 74/488

[58] Field of Search .................................... 74/558, 558.5, 74/551.9, 488, 489, 501.6

[56] References Cited

U.S. PATENT DOCUMENTS

| | | | |
|---|---|---|---|
| 4,798,185 | 1/1989 | Driggers | 74/502.2 X |
| 4,941,369 | 7/1990 | Specht et al. | 74/551.9 |
| 5,758,546 | 6/1998 | Taomo et al. | 74/501.6 |
| 5,868,377 | 2/1999 | Taomo et al. | 74/501.6 X |
| 5,871,202 | 2/1999 | Taomo et al. | 74/501.6 X |

FOREIGN PATENT DOCUMENTS 2 26265 7/1990 Japan .

*Primary Examiner*—Tamara L. Graysay
*Assistant Examiner*—Brandon C. Stallman
*Attorney, Agent, or Firm*—Pillsbury Madison & Sutro LLP

[57] ABSTRACT

A hand lever device is disclosed which has excellent operability and is convenient and comfortable for an operator when an operating portion of a main lever and a grip are gripped together to carry out operation, and which enables a Bowden cable and the like to easily be introduced into the grip. The hand lever device comprises a grip and a lever having a pivotally movable operating portion. The grip has a protuberant portion provided with a lever rest of a depressed configuration for ensconcing the operating portion therein. Preferably, the protuberant portion of the grip is provided with a lever rest in a center portion thereof in cross-section and also provided with a through hole extending through sides of the lever rest for leading and holding control line members such as a cable and a cord.

16 Claims, 8 Drawing Sheets

HAND LEVER DEVICE

BACKGROUND OF THE INVENTION

1. Field of the Invention

The present invention relates to a hand lever device for a working machine such as a hedge trimmer or brush cutter. In particular, it relates to a grip structure of such a hand lever device mounted on a handle of a working machine.

2. Description of the Prior Art

In general, in a conventional working machine such as a hedge trimmer and brush cutter which comprises an operative portion including a cutting blade driven by an internal combustion engine, a grip and a hand lever device are mounted on a U-shaped handle, a bar handle or the like of the working machine so as to provide manual control of output force of an internal combustion engine. Such a hand lever comprises a lever for controlling the degree of opening of a throttle valve of the internal combustion engine and a switch for stopping the internal combustion engine.

Japanese Patent Application No. 192575/1996 by the Assignee of the present application discloses a hand lever device (see FIG. 8, which is a left external side view, and FIG. 9, which is a sectional view taken along the line IX—IX and viewed in the direction of arrows in FIG. 8).

The hand lever device 10' has a case 20' fixedly mounted on a handle 7' in the vicinity of a proximal grip 11'. In the case 20', a main lever 30' has its one end pivotally held for drawing a throttle cable 17' extending through and within an outer tube 16' of a Bowden cable 15' connected to a throttle valve of an internal combustion engine. In a center portion of the top of the case 20', a slide type cut-off switch 50' is provided for short-circuiting an electrical circuit to a spark plug of the internal combustion engine to stop the engine.

As shown in FIG. 9, the Bowden cable 15' and a conducting cord 18' for the cut-off switch 50' are backward led through a relatively large through hole 19' formed in a lower portion of the proximal grip 11' and connected to the internal combustion engine.

The main lever 30' pivotally held by the case 20' comprises a substantially straight operating portion 31' pivotally operated by an operator's hand in such a manner that it is brought closer to a lever rest 11*c*' formed as a protuberant portion in the bottom of the proximal grip 11'. By pivotally operating the operating portion 31' to bring it closer to the lever rest 11*c*' at the bottom of the proximal grip 11', the throttle cable 17' extending through and within the outer tube 16' of the Bowden cable 15' is drawn to move the throttle valve of the internal combustion engine in the more wide open direction. Output force of the internal combustion engine is thereby increased.

In ordinary operation of the working machine, the hand lever device 10' is used to carry out the operation in such a manner that the proximal grip 11' is gripped by the operator's hand with the operating portion 31' in contact with the lever rest 11*c*' formed in the bottom of the proximal grip 11'.

Accordingly, in the hand lever device 10', the proximal grip 11' and the operating portion 31' are collectively gripped by the operator's hand to carry out the operation. However, in and through the proximal grip 11' between the handle 7' and the operating portion 31', the Bowden cable 15' and the conducting cord 18' are led. This results in a large diameter of the collective gripping. Since the proximal grip 11' and the operating portion 31' are firmly and continuously gripped by the operator during the operation, the gripping is heavy burden on the operator's fingers to cause a problem in operability.

Further, the Bowden cable 15' and the conducting cord 18' are inserted together through a single through hole 19' which is relatively large-sized so as to facilitate the insertion of the line members into the proximal grip 11'. Accordingly, the Bowden cable 15' and the conducting cord 18' tend to move freely in the through hole 19' in the horizontal direction. This causes a disadvantage that these line members are not stably held in the through hole 19'.

SUMMARY OF THE INVENTION

The present invention has been made in view of the above problems. It is, therefore, an object of the present invention to provide a hand lever device which has excellent operability and is convenient and comfortable for an operator when an operating portion of a main lever and a grip are gripped together to carry out operation, and which enables a Bowden cable and the like to easily be introduced into the grip.

To attain the above object, the hand lever device according to the present invention comprises: a grip, and a lever having a pivotally movable operating portion.

The grip has a protuberant portion provided with a lever rest of a depressed configuration for ensconcing the operating portion therein. Preferably, the protuberant portion of the grip is provided with the lever rest in a center portion thereof in cross-section and provided also with a through hole extending through sides of the lever rest for leading and holding control line members such as a cable and a cord.

In a preferred embodiment of the hand lever device according to the present invention, the through hole includes two circular portions provided in the sides of the lever rest and a center slit portion connecting the two circular portions. Alternatively, the through hole may include two circular portions provided in the sides of the lever rest and center slit portions in communication respectively with the two circular portions.

In a further embodiment, the control line members of the hand lever device are a Bowden cable for drawing a throttle valve of an internal combustion engine for a working machine and a conducting cord for stopping the internal combustion engine.

According to the hand lever device of the present invention, which is constructed as described above, the lever rest of a depressed configuration for ensconcing the operating portion therein is provided in the protuberance portion of the grip gripped by an operator's hand together with the operating portion. By virtue of this, the operating portion is fitted in the depressed configuration of the lever rest, leading to a circumferentially reduced size of the resulting grip assemblage of the operating portion and the proximal grip as a whole. Accordingly, the grip assemblage is convenient to grip and thus improved operability is attained.

Further, the proximal grip is provided with the through hole having circular portions extending through right and left portions of the lever rest, and the line members such as a Bowden cable for controlling the throttle valve of the internal combustion engine and a conducting cord for short-circuiting the ignition circuit to stop the engine are separately led through the circular portions of the through hole, respectively. In cooperation with the depressed configuration of the lever rest, this enables the grip assemblage as a whole to be minimized although the Bowden cable and the conducting cord are led through and held in the grip.

Moreover, the through hole of the proximal grip is formed so that the center portion connects the two circular portions. By virtue of this, when the Bowden cable and the conducting cord are inserted into the two circular portions during assembly, when the grip made of a synthetic rubber or the like is deformed by externally exerting forces on the protuberant portion, the center slit portion is vertically expanded to increase inner diameters of the circular portions. The Bowden cable and the conducting cable are thereby introduced into the circular portions with ease. The result is that the Bowden cable and the conducting cable are separately held by the two circular portions, respectively. This ensures stable holding thereof.

DESCRIPTION OF THE PREFERRED EMBODIMENTS

In the following, an embodiment of the present invention will be described with reference to the accompanying drawings.

Figure 1:
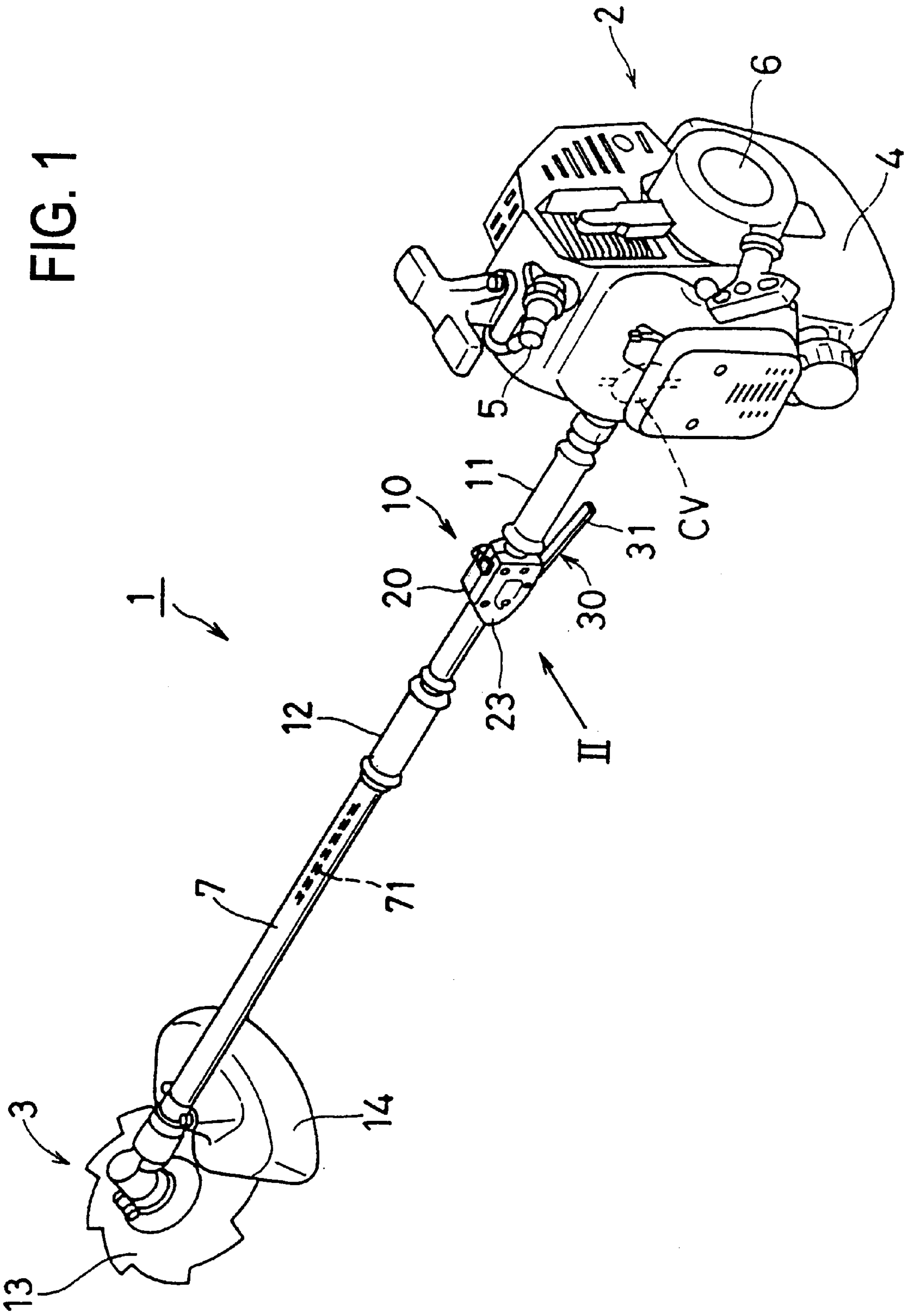
FIG. 1 is a perspective view of a brush cutter employing the hand lever device according to one embodiment of the present invention.

FIG. 1 is a perspective view showing an example of a brush cutter provided with the hand lever device according to one embodiment. The illustrated brush cutter 1 comprises a tubular bar handle or operating rod 7 provided with proximal and distal grips 11, 12 spaced a predetermined distance apart; an operative portion 3 including a cutting blade 13, a safety cover 14 and so forth and provided on the distal end of the bar handle 7; and an internal combustion engine 2, such as a small air-cooled two-cycle gasoline engine, disposed on the proximal end of the bar handle 7. The internal combustion engine 2 serves as a power source for driving the cutting blade 13 via a drive shaft 71 extending through and within the bar handle 7, and the engine 2 is equipped with a recoil starter 6 and a fuel tank 4 and also provided with a carburetor (not shown) having a throttle valve CV and a spark plug 5.

In this example, the throttle valve CV is always biased toward the direction of a minimum degree of opening (for an idle condition). When a throttle cable 17 connected thereto, which will be described below, is drawn from non-operating position in a predetermined amount to eliminate play, the throttle valve CV begins to open from the minimum idle opening position.

The proximal grip 11, which is one of the two grips 11 and 12 that is gripped generally by an operator's right hand, serves as a constituent of the hand lever device 10 according to this embodiment. The proximal grip 11 is provided in order to serve in conjunction with the hand lever device 10 to adjust the degree of opening of the throttle valve CV via the throttle cable 17 during operation.

Figure 2:
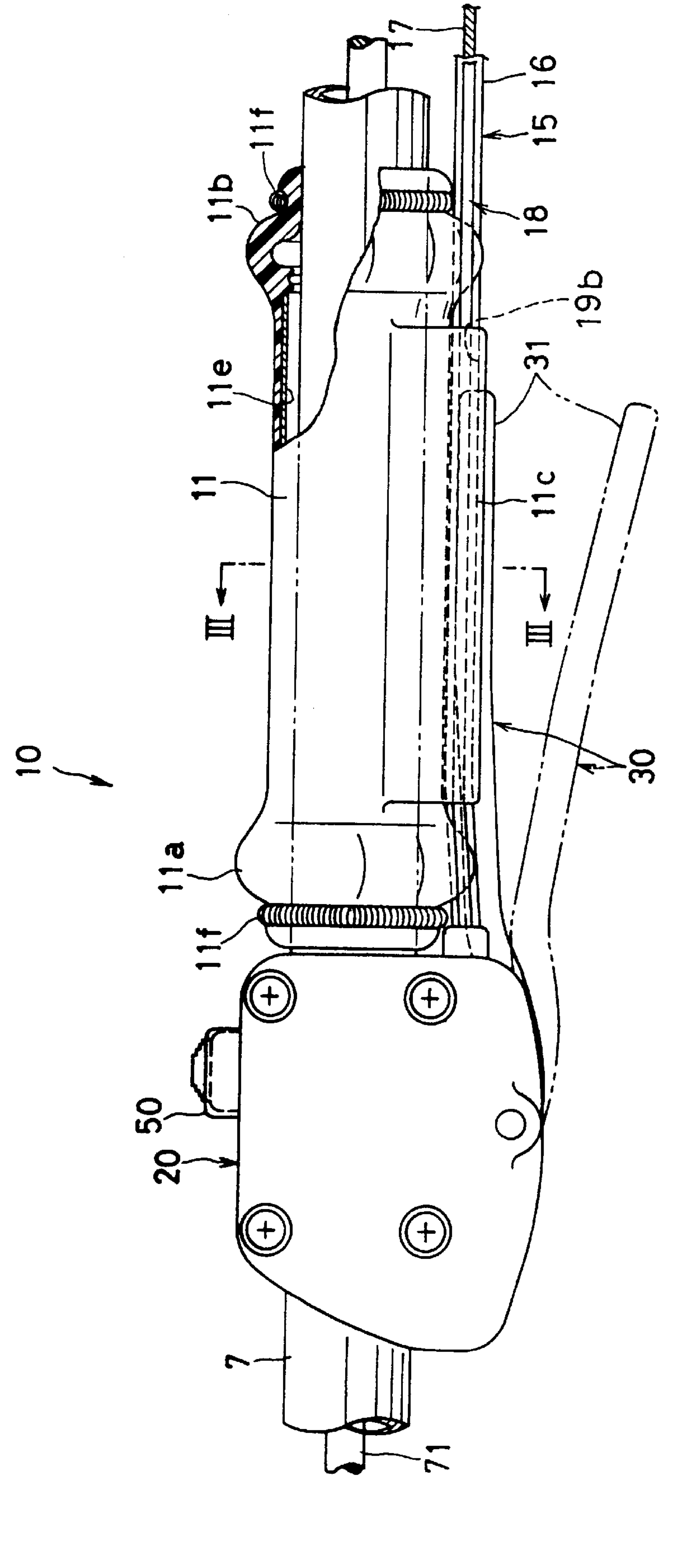
FIG. 2 is an enlarged left side view of the hand lever device in FIG. 1, which is viewed from the direction of the arrow II in FIG. 1.

As shown in FIG. 2, the hand lever device 10 has a case 20 fixedly mounted on the handle 7 adjacently to the distal end of the proximal grip 11. In the case 20, a main lever 30 has its one end pivotally held. The main lever 30 serves to draw the throttle cable 17 extending through and within an outer tube 16 of a Bowden cable 15 as a control line member connected to the throttle valve CV, and it has an operating portion 31. In a center portion of the top of the case 20, a slide type cut-off switch 50 is provided for short-circuiting an ignition circuit of the spark plug 5 of the internal combustion engine 2 to stop the engine 2.

Figure 3:
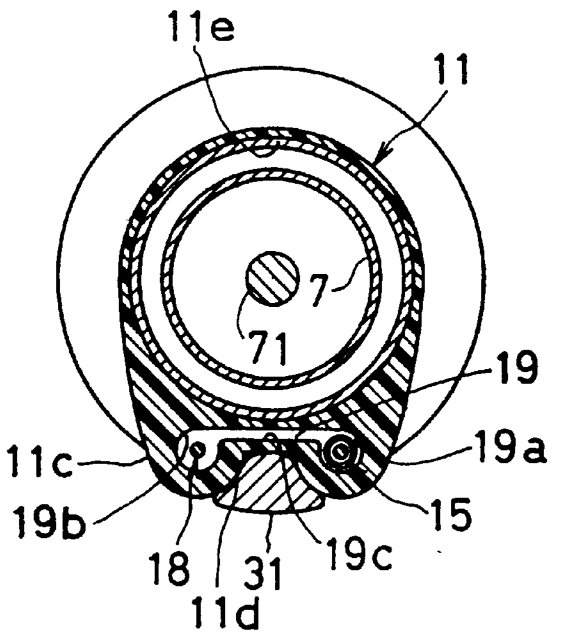
FIG. 3 is a sectional view of a proximal grip of the hand lever device in FIG. 2, which is taken along the line III—III and viewed in the direction of arrows in FIG. 2.

The proximal grip 11 is generally made of an elastic synthetic rubber, elastic synthetic resin or the like and, as shown in FIG. 3, it is integrally formed with a reinforcing tube 11*e* as an insert for preventing crush and thus has a hollow tubular form. The handle 7 is inserted through the hollow of the proximal grip 11, and the proximal grip 11 is elastically fastened onto the handle 7 with its inner circumferential surface including proximal and distal end portions 11*a*, 11*b* by means of spring bands hlf (see FIG. 2). The proximal grip 11 has the bottom of its center portion provided with a protuberant portion 11*c* extending in the longitudinal direction (back-and-forth direction), and the protuberant portion 11*c* has a through hole 19 longitudinally extending therethrough. As shown in FIG. 3, the through hole 19 has a cross-section having a shape of spectacles, and specifically, it comprises right and left portions 19*a* and 19*b* which are circular in section (hereinafter referred to simply as circular portions 19*a* and 19*b*) and a center slit portion 19*c* connecting the two circular portions 19*a* and 19*b*.

The protuberant portion 11*c* of the proximal grip 11 has such a configuration that its portion under the center slit portion 19*c* of the through hole 19 is depressed toward the center portion 19*c* of the through hole 19, and the depressed portion provides a lever rest 11*d*. The lever rest 11*d* is formed so that the operating portion 31 is ensconced therein when the main lever 30 is pivotally operated to bring the operating portion 31 into contact with the proximal grip 11.

The Bowden cable 15 as a control line member led from the internal combustion engine 2 and the conducting cord 18 connected to the cut-off switch 50 are led through the right and left circular portions 19*a* and 19*b* of the through hole 19, respectively, and then led into the case 20 of the hand lever device 10. The outer tube 16 of the Bowden cable 15 is fastened to the case 20, and the throttle cable 17 extending through and within the outer tube 16 is connected to the main lever 30 in the case 20. The conducting cord 18 is led into the case 20 and connected to a connecting terminal of the slide type cut-off switch 50.

The following is a description of the operation of the hand lever device 10 of the first embodiment as described above.

In the hand lever device 10 of the first embodiment, if the recoil starter 6 of the internal combustion engine 2 is operated with the operating portion 31 of the main lever 30 at the position for idling as shown by the broken line in FIG. 2, the internal combustion engine 2 is started. In this condition, however, the internal combustion engine 2 is in idling condition, and thus the rotational speed thereof is so low that a centrifugal clutch (not shown) is still disconnective. Consequently, the cutting blade 13 of the operative portion 3 is not rotated.

In this condition, when the operating portion 31 of the main lever 30 is pivotally operated toward the lever rest 11*d* of the proximal grip 11 and thereby brought to the set position (shown by the solid line in FIG. 2) where the operating portion 31 is ensconced in the lever rest lid of the proximal grip 11, the throttle cable 17 connected to the main lever 30 is drawn in a predetermined amount to move the throttle valve CV from the minimum opening degree (the opening degree for idle running) toward the more wide open direction. In consequence, output force of the internal combustion engine 2 is increased to connect the centrifugal clutch. The cutting blade 13 of the operative portion 3 is thereby rotated and put in condition for operation.

As understood from the above description, bush and grass cleaning operation is carried out with the operating portion 31 of the main lever 30 ensconced in and in contact with the lever rest 11*d* of the proximal grip 11. When the internal combustion engine 2 is stopped to discontinue the operation, the operating portion 31 of the main lever 30 is released from the lever rest 11*d* to return to the position shown by the broken line in FIG. 2, thereby lowering rotational speed of the engine 2 to bring the centrifugal clutch into disconnective condition. The transmission of the driving force to the cutting blade 13 of the operative portion 3 is thereby cut off. Then, the slide type cut-off switch 50 is operated to short-circuit the ignition circuit of the spark plug 5 of the internal combustion engine 2 via the conducting cord 18, thereby stopping the engine 2.

As described above, in the hand lever device 10 of this embodiment, the lever rest 11*d* of the proximal grip 11 gripped by an operator's hand has such a depressed configuration that the operating portion 31 is ensconced therein in conformity therewith. By virtue of this, the operating portion 31 is fitted in the depressed configuration of the lever rest 11*d*, enabling a circumferentially reduced size of the resulting grip assemblage of the operating portion 31 and the proximal grip 11 as a whole to be realized. Accordingly, the grip assemblage is convenient to grip and thus improved operability is attained.

Further, the proximal grip 11 is provided with the through hole 19 having circular portions 19*a* and 19*b* extending through right and left sides of the lever rest 11*d*. The Bowden cable 15 as a control line member for controlling the throttle valve CV of the internal combustion engine 2 and the conducting cord 18 for stopping the engine 2 are separately led through the circular portions 19*a* and 19*b* of the through hole 19, respectively. In cooperation with the depressed configuration of the lever rest 11*d*, this enables the proximal grip 11 and the operating portion 31 as a whole to be minimized although the Bowden cable 15 and the conducting cord 18 are led through and held in the grip 11.

Moreover, the through hole 19 of the proximal grip 11 is so formed as to have the center portion 19*c* connecting the two circular portions 19*a* and 19*b*. By virtue of this, in insertion of the Bowden cable 15 and the conducting cord 18 into the two circular portions 19*a* and 19*b* of the through hole 19 during assembly, when the grip 11 made of a synthetic rubber or the like is deformed by externally exerting forces on the protuberant portion 11*c* of the proximal grip 11, the center slit portion 19*c* is vertically expanded to increase inner diameters of the circular portions 19*a* and 19*b*. The Bowden cable 15 and the conducting cable 18 are thereby introduced into the circular portions 19*a* and 19*b* with ease. After their introduction, the Bowden cable 15 and the conducting cable 18 are separately held by the two circular portions 19*a* and 19*b*, respectively. This ensures stable holding thereof.

In the foregoing, one embodiment of the present invention has been described in detail. It is, however, to be understood that the present invention is by no means restricted to the above-described embodiment, and that various modifications may be made within the scope which does not depart from the spirit of the present invention as defined in the claims.

Figure 4:
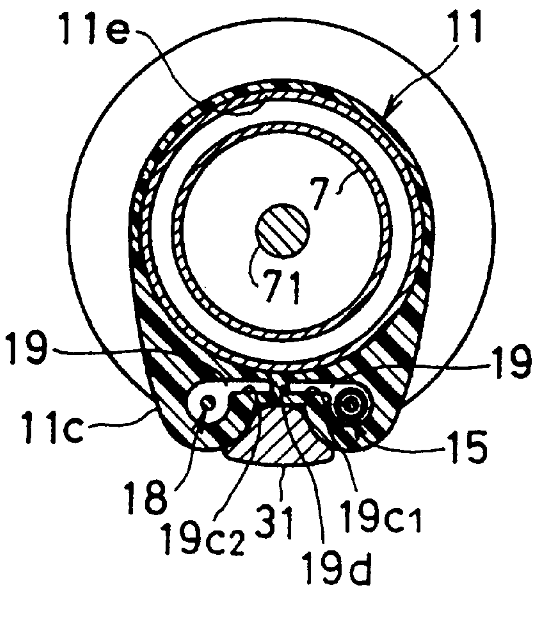
FIG. 4 is a sectional view of a proximal grip of the hand lever device according to another embodiment of the present invention, which is similar to FIG. 3.

For example, in the above-described embodiment, the through hole 19 of the proximal grip 11 comprises the right and left two circular portions 19*a* and 19*b* and the center slit portion 19*c* connecting the circular portions 19*a* and 19*b*. As shown in FIG. 4, however, the center slit portion 19*c* may be separated by a center wall 19*d* into two slit portions 19*c*1 and 19*c*2 separately in communication with the two circular portions 19*a* and 19*b*, respectively, to prevent distortion of the protuberant portion 11*c* in the right-left direction (horizontal direction). Also in this embodiment, when the protuberant portion 11*c* of the proximal grip 11 is deformed by externally exerting forces on the protuberant portion 11*c*, the two slit portions 19*c*1 and 19*c*2 are vertically expanded to increase inner diameters of the circular portions 19*a* and 19*b*. By virtue of this, the Bowden cable 15 and the conducting cable 18 are introduced into the circular portions 19*a* and 19*b* with ease.

Figure 5:
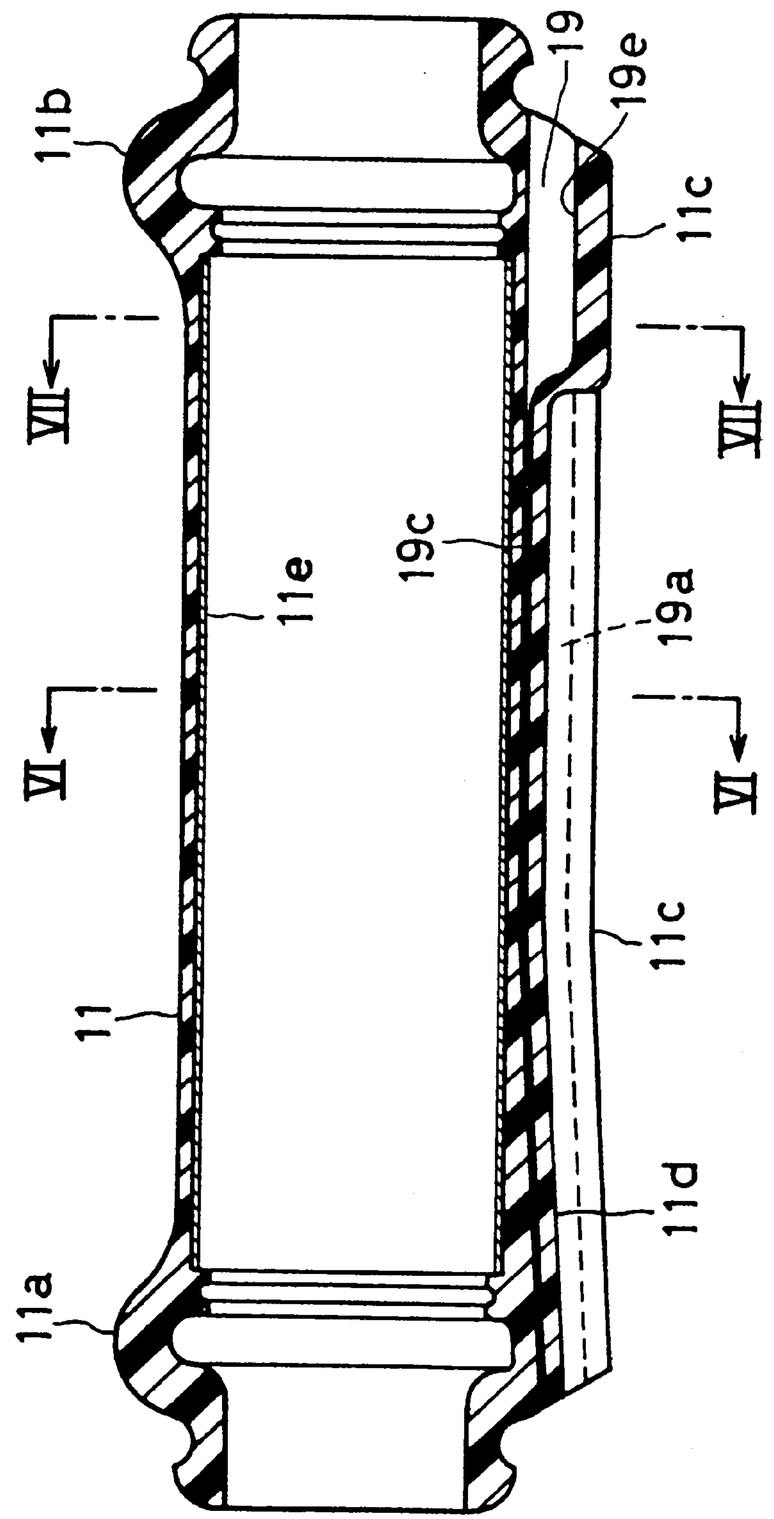
FIG. 5 is a longitudinal sectional view of a proximal grip of the hand lever device according to still another embodiment of the present invention.
Figure 6:
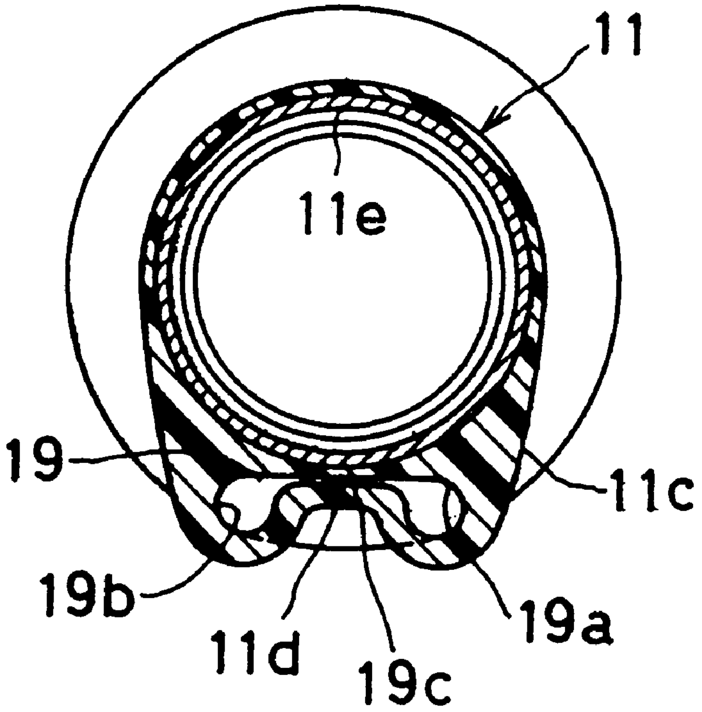
FIG. 6 is a sectional view of the proximal grip of the hand lever device in FIG. 5, which is taken along the line VI—VI and viewed in the direction of arrows in FIG. 5.
Figure 7:
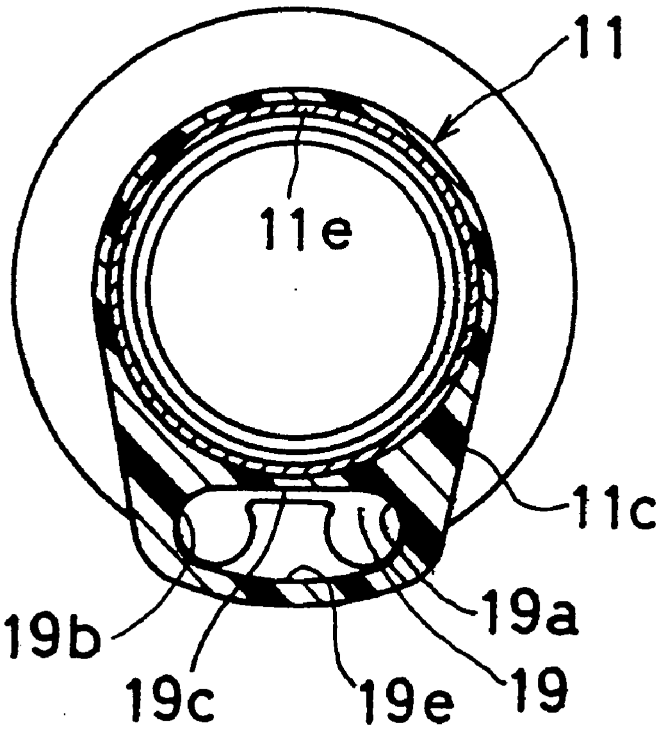
FIG. 7 is a sectional view of the proximal grip of the hand lever device in FIG. 5, which is taken along the line VII—VII and viewed in the direction of arrows in FIG. 5.
Figure 8:
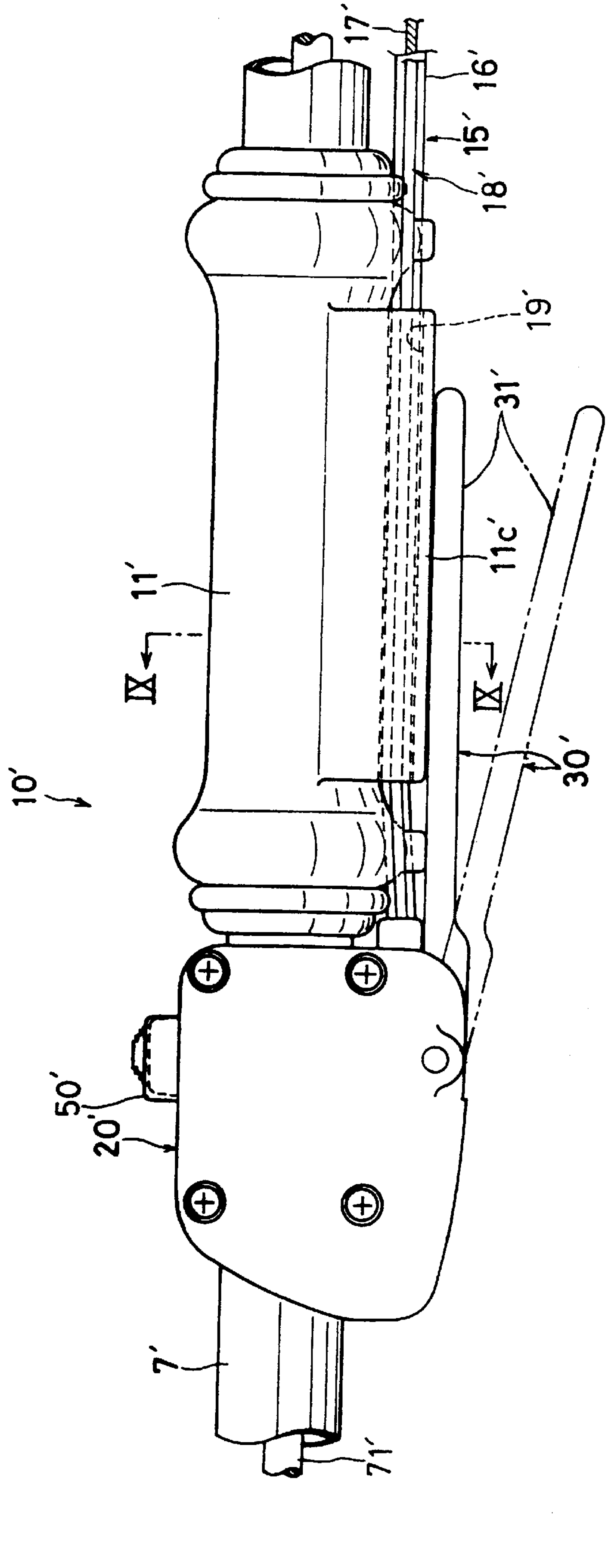
FIG. 8 PRIOR ART
FIG. 8 is a left side view of a prior art hand lever device.
Figure 9:
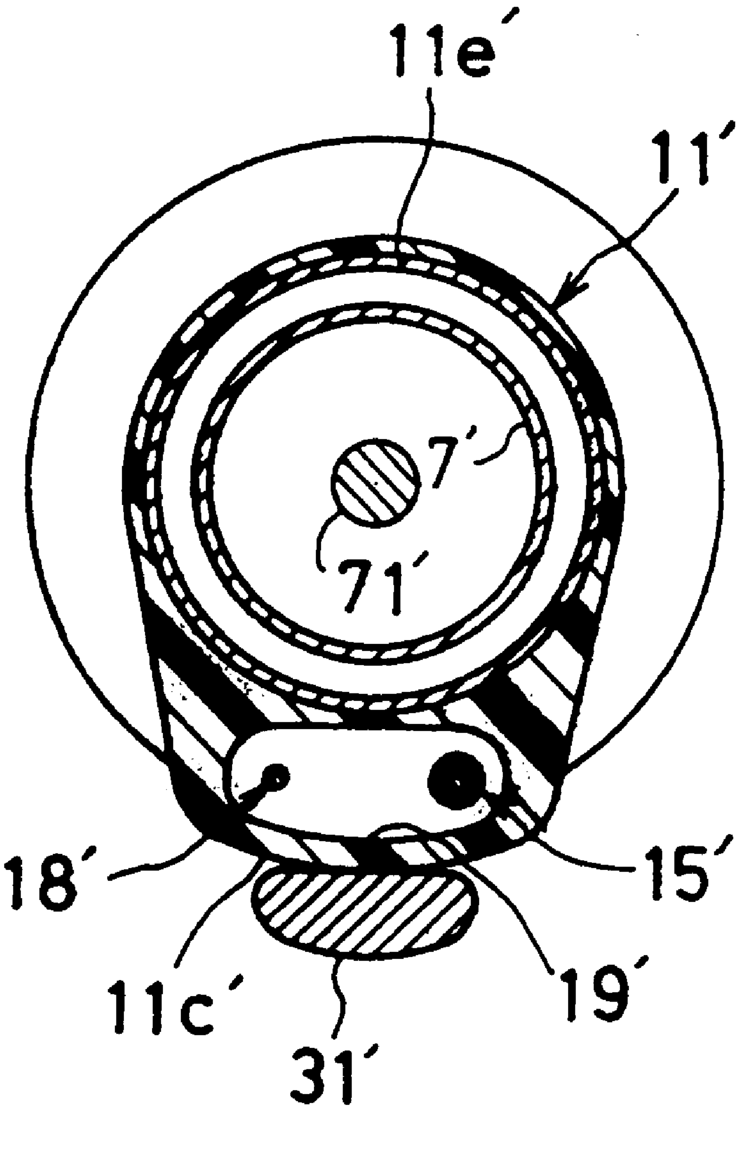
FIG. 9 PRIOR ART
FIG. 9 is a sectional view of the proximal grip of the hand lever device in FIG. 8, which is taken along the line IX—IX and viewed in the direction of arrows in FIG. 8.

Further, as shown in FIGS. 5 to 7, the structure of the protuberant portion 11*c* of the proximal grip 11 may be partly modified in its rear portion (adjacent to the internal combustion engine 2). Specifically, the protuberant portion 11*c* may be extended in the rear direction and, in the extension, provided with a portion of the through hole 19 which is formed as a single large through hole 19*e*. By forming the single large through hole 19*e* in the portion of the proximal grip 11 adjacent to the internal combustion engine 2 as described above, the Bowden cable 15 and the conducting cord 18 may collectively be led from the proximal grip 11 to the internal combustion engine 2.

As understood from the above description, according to the hand lever device of the present invention, the contour of the protuberant portion of the grip and the through hole for the control line members are specifically configured. By virtue of this, a circumferentially reduced size of the grip is realized and thus improved operability is attained, and yet, the control line members are easily introduced into and stably held in the through hole.

What is claimed is:

1. A hand lever device comprising:

a grip having a protuberant portion, said protuberant portion having a lever rest of a depressed configuration therein, and a lever having a pivotally movable operating portion, wherein said lever rest of said grip is configured to ensconce said operating portion of said lever therein, wherein the protuberant portion of said grip is provided with said lever rest in a center portion thereof in cross-section and further said protuberant portion defining a through hole extending through the protuberant portion along sides of the lever rest for leading and holding control line members.

2. The hand lever device of claim 1, wherein said through hole includes two circular portions provided on opposite lateral sides of the lever rest and a center slit portion connecting said two circular portions.

3. The hand lever device of claim 2, wherein said center slit portion is divided by a center wall so that said through hole is divided into left and right circular portions.

4. The hand lever device of claims 2 through 3, wherein said control line members are a) a Bowden cable for drawing a throttle valve CV of an internal combustion engine for a working machine and b) a conducting cord for stopping said internal combustion engine.

5. The hand lever device of claim 2, wherein said slit portion maintains separate in orientation said control line members in their respective circular portions.

6. The hand lever device of claim 2, further comprising a working machine operationally attached to said hand lever device.

7. A hand lever device comprising:

a grip having a protuberant portion, said protuberant portion having a lever rest of a depressed configuration therein, said protuberant portion further defining a through hole comprising two circular portions provided on opposite lateral sides of the lever rest for leading and holding control line members, said through hole further comprising a slit portion connecting said circular portions; and a lever having a pivotally movable operating portion, wherein said lever rest of said grip is configured to ensconce said operating portion of said lever therein.

8. The hand lever device of claim 7, wherein said lever rest is corresponded in shape to said operating portion of said lever.

9. The hand lever device of claim 7, wherein said slit portion maintains said control line members in their respective circular portions.

10. The hand lever device of claim 7, wherein said center slit portion is divided by a wall so that said slit portion is divided into two slit portions and said through hole is divided into left and right circular portions.

11. A hand lever device comprising:

a grip having a longitudinally extending bulge that includes a recessed lever rest portion, a lever having a moveable portion that fits within said lever rest portion, said lever rest portion positioned centrally in said bulge and said bulge including a longitudinally extending through hole to provide a passage incorporating control line members.

12. A hand lever device according to claim 11, wherein said through hole includes two circular portions provided on opposite lateral sides of the lever rest and a center slit portion connecting said two circular portions.

13. A hand lever device according to claim 12, wherein said center slit portion is divided by a center wall so that said through hole is divided into left and right circular portions.

14. A hand lever device according to claim 13, wherein said center slit portion maintains separate in orientation said control line members in their respective circular portions.

15. A hand lever device according to any one of claims 11 through 14, wherein said control line members are a) a Bowden cable for drawing a throttle valve CV of an internal combustion engine for a working machine and b) a conducting cord for stopping said internal combustion engine.

16. A hand lever device according to claim 11, further comprising a working machine operationally attached to said hand lever device.

* * * * *